United States Patent [19]

Watanabe et al.

[11] 4,259,119

[45] Mar. 31, 1981

[54] BORIDE-BASED REFRACTORY MATERIALS

[75] Inventors: Tadahiko Watanabe, Saga; Hiroki Shimizu, Okaya, both of Japan

[73] Assignee: Director-General of the Agency of Industrial Science and Technology, Tokyo, Japan

[21] Appl. No.: 89,487

[22] Filed: Oct. 30, 1979

[30] Foreign Application Priority Data

Mar. 27, 1979 [JP] Japan .................................. 54-36398

[51] Int. Cl.³ ............................................ C04B 35/58
[52] U.S. Cl. ...................................... 106/55; 106/59; 106/65; 106/73.3
[58] Field of Search .................... 106/55, 57, 65, 73.3, 106/73.32; 423/297

[56] References Cited

U.S. PATENT DOCUMENTS 2,802,748  8/1957  Glaser ............................... 106/55 X

OTHER PUBLICATIONS

"Preparation and Evaluation of Diborides;" Bureau of Miner R.I. 6407; Dept. of Interior, Bureau of Mines, 1964.

*Primary Examiner*—G. O. Peters
*Attorney, Agent, or Firm*—Brisebois & Kruger

[57] ABSTRACT

A novel high strength, high heat resistance sintered body suitable for use as refractory and abrasive materials is proposed. The sintered body comprises from 99.99 to 70% by weight of a combination of at least two kinds of metal diborides selected from the group consisting of diborides of Ti, Ta, Cr, Mn, Mo, Y, V, Hf, Nb, Al and Zr and from 0.01 to 30% by weight of a metal boride or borides selected from the group consisting of borides of nickel, iron and cobalt.

The sintered body of the invention can be prepared by sintering the powdery mixture of the components at a relatively low temperature of 1800° C. or lower and has a bending strength as high as 190 kg/mm² and a Vickers hardness of 3300 kg/mm² at room temperature and 2400 kg/mm² at 1000° C.

5 Claims, No Drawings

BORIDE-BASED REFRACTORY MATERIALS

BACKGROUND OF THE INVENTION

The present invention relates to a novel class of boride-based refractory, abrasive materials or, more particularly, to a class of refractory and abrasive materials based on certain metal diborides as sintered with high density and high mechanical strengths even at elevated temperatures.

With their extremely high melting points and hardness as well as excellent mechanical strengths at elevated temperatures, metal diborides such as titanium diboride are the most promising materials for construction of rockets, cutting tools, parts of thermal engines and the like. When metal diborides are to be sintered for use in these applications, however, difficulties are encountered because the sintering temperature is extremely high and the sintered bodies obtained are poor in the bending strength and relatively brittle regardless of whether the metal diborides are used either singly or as a combination of two or more.

The inventors conducted extensive investigations to solve the above problems in the sintered bodies of metal diborides and discovered that titanium diboride could give excellent sintered bodies when admixed with an alloy of nickel and phosphorus (see, for example, Japanese Patent Publication No. 51-23625).

These titanium diboride-based sintered bodies are developed by the inventors possess a bending strength reaching 100 to 150 kg/mm$^2$ but, needless to say, even higher bending strengths are sometimes required in the practical use of these kinds of refractory materials. In addition, the heat resistance of the above developed titanium diboride-based refractory materials is not always sufficient due to the use of a nickel-phosphorus alloy with a relatively low melting point down to 890° C.

Another problem of the metal diboride-based sintered bodies for refractory and abrasive uses is that they are prepared by sintering at an undesirably high sintering temperature of 1800° C. or higher.

SUMMARY OF THE INVENTION

It is therefore an object of the present invention to provide a novel sintered body for refractory and abrasive uses based on metal diborides with a bending strength as high as 150 to 200 kg/mm$^2$ and an excellent heat resistance as evaluated by the hardness at elevated temperatures.

Another object of the present invention is to provide a novel sintered body for refractory and abrasive uses based on metal diborides, which has a high bending strength and an excellent heat resistance and yet can be prepared by sintering at a relatively low sintering temperature.

Thus the sintered body according to the present invention comprises (a) from 99.99 to 70% by weight of a combination of at least two of the metal diborides selected from the group consisting of $TiB_2$, $CrB_2$, $TaB_2$, $MnB_2$, $MoB_2$, $YB_2$, $VB_2$, $HfB_2$, $NbB_2$, $AlB_2$ and $ZrB_2$, and (b) from 0.01 to 30% by weight of a metal boride or a combination of metal borides selected from the group consisting of borides of nickel, iron and cobalt.

When properly formulated and sintered at about 1800° C., the sintered body with the above composition may have a sufficiently high bending strength of 150 kg/mm$^2$ or larger and a heat resistance as evaluated by the Vickers hardness at 1000° C. of 2000 kg/mm$^2$ or higher.

It is also proposed that the above given sintering temperature can be lowered to about 1600° C. without substantially affecting the properties of the sintered body by adding, in addition to the above given ingredients (a) and (b), from 0.001 to 15% by weight, based on the weight of the sintered body, of a mixture or an alloy composed of from 97 to 80% by weight of nickel and from 3 to 20% by weight of phosphorus.

DETAILED DESCRIPTION OF THE PREFERRED EMBODIMENTS

As is described above, the component (a) of the inventive sintered body is a combination of two kinds or more of metal diborides selected from the group consisting of diborides of titanium, chromium, tantalum, manganese, molybdenum, yttrium, vanadium, hafnium, niobium, aluminum and zirconium. In order to fully obtain the beneficial effect, e.g. high heat resistance, given by combining two kinds or more of the metal diborides, it is recommended that the content of each of the metal diborides in the sintered body is at least 0.5% by weight. It is also desirable that one of the metal diborides as combined is titanium diboride $TiB_2$ or, rather, substantial portion, say, 20% by weight or more, in the sintered body is titanium diboride in consideration of the high melting point and relatively low cost.

The second component of the inventive sintered body which serves as a binder in the sintered body is a metal boride or a combination of metal borides selected from borides of nickel, iron and cobalt.

The borides of nickel, iron and cobalt each comprise several kinds of the borides according to the molar proportion of boron and the metallic element. For example, the nickel borides include $NiB$, $Ni_4B_3$, $Ni_2B$ and $Ni_3B$, the iron borides include $FeB$ and $Fe_2B$ and the cobalt borides include $CoB$, $Co_2B$ and $Co_3B$. These borides may be used as a mixture of two or more. Preferred borides are $NiB$, $Ni_4B_3$, $FeB$ and $CoB$.

The amount of the metal boride or borides in the sintered body should be in the range from 0.01 to 30% by weight or, preferably, from 0.05 to 15% by weight, especially, when the sintered body is required to withstand an extremely high temperature as in cutting tools, the balance being the combination of the metal diborides as the component (a), since smaller amounts than 0.01% by weight cannot give sufficient mechanical strengths to the sintered body which excessive amounts over 30% by weight result in marked decrease in the heat resistance of the sintered body.

It should be noted that the metal boride or borides as the second component in an amount in excess over 15% by weight may be disadvantageous if the mechanical strengths of the sintered body at an elevated temperature are of utmost importance because the Vickers hardness of the sintered body at 1000° C. is decreased to about 1200 kg/mm$^2$ or below when the amount of the metal boride or borides exceeds 15% by weight in contrast to the extremely high Vickers hardness at 1000° C. of 2000 to 2400 kg/mm$^2$ or even higher with smaller amounts of the metal boride or borides. The above disadvantage is, however, not significant when the sintered body is directed to the use such as parts for thermal engines where no such an extremely high heat resistance is required. On the contrary, advantages are obtained by increasing the amount of the metal borides over 15% by weight in the possibility of lowering the sintering temperature down to, say, 1600° C. in contrast to 1800° C. necessitated for sintering when the amount of the metal boride is larger as well as in obtaining a somewhat increased bending strength of the sintered body.

The metal diborides and the borides of nickel, iron and cobalt to be used in the present invention have desirably a particle size distribution such that the average particle diameter is 5 μm of smaller.

It is noted that substantially the same effect is obtained by the replacement of the borides of nickel, iron or cobalt with an ingredient or ingredients which can form the respective boride in the course of sintering at an elevated temperature. For example, a mixture of a powder of elementary boron and a metal powder of nickel, iron or cobalt in a proper molar mixing ratio can substitute the boride of nickel, iron or cobalt, respectively.

The boride-based sintered body for refractory and abrasive use in accordance with the present invention is prepared in a manner as follows. The sintering is performed by the techniques of hot pressing, by sintering of a green body prepared in advance by compression molding of the powder mixture at room temperature or by the techniques of so-called infiltration. Typically, a powder mixture obtained by intimate mixing of the ingredients is packed in a mold made of, for example, graphite and subjected to sintering by heating at a temperature of 1300° C. or higher under a pressure of 50 to 300 kg/cm$^2$ for 10 to 60 minutes in vacuum or in an atmosphere of a neutral or reducing gas such as argon or hydrogen. Alternatively, the powder mixture as above is shaped in advance into a green body by compression molding under a pressure in the same range as above at room temperature and the green body is subjected to sintering similarly.

The atmospheric condition in the sintering step is also of some significance. When the sintering is carried out in vacuum, for example, trace amounts of remaining oxygen may adversely affect the mechanical properties of the sintered bodies, especially, when the powder mixture under sintering contains a component susceptible to oxidation such as AlB$_2$ and ZrB$_2$. In this regard, the degree of vacuum should be as good as possible or, desirably, $1 \times 10^{-2}$ mmHg or better. Alternatively, it is recommended to carry out the sintering in an atmosphere of a reducing gas such as hydrogen rather than in a vacuum of 0.1 mmHg or higher in pressure when the powder mixture under sintering contains AlB$_2$ or ZrB$_2$.

As is mentioned earlier, an additional advantage is obtained by admixing the above described components (a) and (b) with a third component (c) which is a mixture or an alloy of nickel and phosphorus. The alloy of nickel and phosphorus here mentioned is an alloy composed of 97 to 80% by weight of nickel and 3 to 20% by weight of phosphorus and the mixture of metallic nickel and elementary phosphorus may be composed of the same weight ratio of nickel and phosphorus both in powdery forms to give an equivalent effect to the use of the nickel-phosphorus alloy.

The amount of the mixture or alloy of nickel and phosphorus to be contained in the sintered body is in the range from 0.001 to 15% by weight based on the amount of the sintered body because any smaller amounts than 0.001% by weight cannot give a desired effect of lowering the sintering temperature while an excessive amount over 15% by weight results in an undesirable lowering of the heat resistance of the sintered body.

The procedure for the preparation of a sintered body with admixture of the mixture or alloy of nickel and phosphorus is substantially the same as in the case without the addition of the mixture or alloy of nickel and phosphorus excepting the possibility of further lowering the sintering temperature down to about 1000° C.

The sintered bodies prepared as described above in accordance with the present invention are suitable for use as a refractory and abrasive material with their high mechanical strengths, e.g. bending strength and hardness, especially, at elevated temperatures so that they can find wide applications in the fields of cutting tools, materials for rocket construction, parts for thermal engines, anti-abrasive materials and the like.

Following are the examples to illustrate the present invention in further detail, in which percentages are all given by % by weight.

EXAMPLE 1. (EXPERIMENTS NO. 1 TO NO. 86)

Powdery mixtures were prepared each by admixing and intimately blending titanium diboride TiB$_2$ with a second metal diboride which was one of TaB$_2$, NbB$_2$, VB$_2$, CrB$_2$, MoB$_2$, MnB$_2$, HfB$_2$, AlB$_2$, ZrB$_2$ and YB$_2$ and one or a combination of the binder borides NiB, Ni$_4$B$_3$, FeB and CoB in amounts from 2.2 to 50% and from 0.01 to 30%, respectively, the balance being the titanium diboride, and each of the powdery mixtures was subjected to sintering by the techniques of hot pressing for 30 minutes at a temperature of 1600° to 1800° C. in a graphite mold under a pressure of 50 to 300 kg/cm$^2$ in vacuum of 0.1 to 0.5 mmHg or in an atmosphere of hydrogen or argon. The formulations and the sintering conditions are summarized in Tables 1—1 to 1-3. In Experiments No. 62 to No. 65 and No. 71 to No. 74 where the second metal diboride was AlB$_2$ or ZrB$_2$, the pressure of the vacuum atmosphere was maintained at $1 \times 10^{-3}$ mmHg or lower. In some of the experiments, the powder mixture was shaped by compression molding at room temperature under a pressure as indicated in the tables into green bodies which were then subjected to sintering for 60 minutes at a temperature and in an atmosphere also indicated in the tables.

The thus obtained sintered bodies were subjected to the measurements of the relative density, bending strength, and Vickers hardness either at room temperature or at 1000° C. The determination of the bending strength was carried out substantially according to the procedure specified in JIS H 5501 though with somewhat modified dimensions of the test specimens. The results of the measurements are set out in Tables 2-1 to 2-3.

For comparison, the second metal diboride in the above formulations was omitted and titanium diboride was admixed with either one of NiB, CoB and FeB in an amount of 1% or 10%, the balance being the titanium diboride. Each of the powder mixtures was subjected to sintering by hot pressing at 1600° C. for 30 minutes in vacuum under a pressure of 200 kg/cm$^2$ or 165 kg/cm$^2$. The bending strength of the thus sintered bodies was determined at room temperature and the results are set out in Table 3 together with the relative density of the sintered bodies as well as with the formulation and the pressure under which sintering was carried out.

EXAMPLE 2. (EXPERIMENTS NO. 87 TO NO. 104)

The experimental procedures were substantially the same as in Example 1 except that the metal diboride as the base component was $TaB_2$, $NbB_2$ or $VB_2$ instead of $TiB_2$. Thus, the base diboride, i.e. $TaB_2$, $NbB_2$ or $VB_2$, was admixed with titanium diboride and either one of NiB, $Ni_4B_3$, FeB and CoB in amounts of from 1 to 40% and from 0.5 to 1.0%, respectively, the balance being the base diboride, and sintering of each of the powder mixtures was carried out by the techniques of hot pressing as in Example 1 at a temperature from 1600° to 1800° C. under a pressure of 230 kg/cm² in vacuum.

The formulation, sintering temperature and the results of the measurements of the mechanical strengths of the sintered bodies are summarized in Table 4. The relative density of the sintered bodies was 100% in each of the experiments.

TABLE 1-1

| Exp. No. | Second diboride, % | | NiB | Binder boride, % Ni₄B₃ | FeB | CoB | Temp., °C. | Sintering conditions Pressure, kg/cm² | Atmosphere |
|---|---|---|---|---|---|---|---|---|---|
| 1  |       | 5  | —    | —    | —    | 1    | 1800 | 230  | Vacuum |
| 2  |       | 5  | 1    | —    | —    | —    | 1800 | 230  | Vacuum |
| 3  |       | 5  | 1    | —    | —    | —    | 1800 | —*   | Vacuum |
| 4  | $TaB_2$ | 5 | —   | 0.5  | —    | —    | 1800 | 230  | Hydrogen |
| 5  |       | 5  | —    | —    | 1    | —    | 1800 | 230  | Vacuum |
| 6  |       | 5  | 0.5  | —    | 0.5  | 0.5  | 1800 | 230  | Vacuum |
| 7  |       | 5  | —    | —    | 0.5  | —    | 1800 | —*   | Argon |
| 8  |       | 40 | —    | —    | —    | 0.1  | 1800 | 300  | Vacuum |
| 9  |       | 20 | 30   | —    | —    | —    | 1600 | 50   | Vacuum |
| 10 |       | 5  | 1    | —    | —    | —    | 1800 | 230  | Vacuum |
| 11 |       | 5  | 1    | —    | —    | —    | 1800 | 230  | Hydrogen |
| 12 |       | 5  | 1    | —    | —    | —    | 1800 | 230  | Argon |
| 13 |       | 5  | 1    | —    | —    | —    | 1800 | —*   | Vacuum |
| 14 | $NbB_2$ | 5 | —   | —    | —    | 1    | 1800 | 230  | Vacuum |
| 15 |       | 5  | —    | —    | 1    | —    | 1800 | 230  | Vacuum |
| 16 |       | 50 | —    | —    | 3    | —    | 1800 | 230  | Vaccum |
| 17 |       | 10 | 0.1  | —    | —    | —    | 1800 | 300  | Vacuum |
| 18 |       | 5  | —    | —    | 30   | —    | 1700 | 50   | Vacuum |
| 19 |       | 5  | 0.05 | 0.05 | 0.05 | 0.05 | 1800 | 300  | Vacuum |
| 20 |       | 5  | 1    | —    | —    | —    | 1800 | 230  | Vacuum |
| 21 |       | 5  | —    | 1    | —    | —    | 1800 | 230  | Vacuum |
| 22 |       | 5  | —    | —    | —    | 1    | 1800 | 230  | Vacuum |
| 23 |       | 5  | —    | —    | 1    | —    | 1800 | 230  | Vacuum |
| 24 | $VB_2$ | 5 | 0.5 | —    | 0.5  | 0.5  | 1800 | 230  | Vacuum |
| 25 |       | 5  | —    | —    | —    | 1    | 1600 | —*   | Vacuum |
| 26 |       | 50 | —    | —    | —    | 1    | 1800 | 230  | Vacuum |
| 27 |       | 10 | —    | —    | —    | 0.1  | 1800 | 300  | Vacuum |
| 28 |       | 5  | —    | —    | 0.1  | —    | 1800 | 300  | Hydrogen |
| 29 |       | 50 | 30   | —    | —    | —    | 1600 | 50   | Vacuum |

*Green bodies were shaped by compression molding at room temperature followed by sintering at the temperature and in the atmosphere indicated.

TABLE 1-2

| Exp. No. | Second diboride, % | | NiB | Binder boride, % Ni₄B₃ | FeB | CoB | Temp., °C. | Sintering conditions Pressure kg/cm² | Atmosphere |
|---|---|---|---|---|---|---|---|---|---|
| 30 |       | 2.2 | 1    | —    | —    | —    | 1800 | 230 | Vacuum |
| 31 |       | 2.2 | —    | 1    | —    | —    | 1800 | 230 | Vacuum |
| 32 |       | 2.2 | —    | —    | —    | 1    | 1800 | 230 | Vacuum |
| 33 |       | 2.2 | —    | —    | 1    | —    | 1800 | 230 | Vacuum |
| 34 |       | 2.2 | —    | —    | —    | 1    | 1800 | 230 | Argon |
| 35 | $CrB_2$ | 2.2 | — | —    | —    | 1    | 1800 | 230 | Hydrogen |
| 36 |       | 2.2 | —    | —    | 1    | —    | 1800 | —*  | Vacuum |
| 37 |       | 2.2 | 1    | —    | —    | —    | 1600 | —*  | Hydrogen |
| 38 |       | 2.2 | —    | —    | —    | 0.1  | 1800 | 300 | Vacuum |
| 39 |       | 3.9 | —    | —    | —    | 20   | 1600 | 50  | Vacuum |
| 40 |       | 2.2 | 0.1  | —    | 0.1  | 0.1  | 1800 | 300 | Vacuum |
| 41 |       | 5   | 1    | —    | —    | —    | 1800 | 230 | Vacuum |
| 42 |       | 5   | —    | 1    | —    | —    | 1800 | 230 | Vacuum |
| 43 |       | 5   | —    | —    | —    | 1    | 1800 | 230 | Vacuum |
| 44 |       | 5   | —    | —    | 1    | —    | 1800 | 230 | Vacuum |
| 45 | $MoB_2$ | 5 | —  | —    | —    | 1    | 1800 | —*  | Vacuum |
| 46 |       | 5   | —    | —    | 1    | —    | 1800 | 230 | Hydrogen |
| 47 |       | 50  | —    | —    | —    | 1    | 1800 | 230 | Vacuum |
| 48 |       | 5   | —    | —    | —    | 0.1  | 1800 | 300 | Vacuum |
| 49 |       | 5   | —    | —    | 30   | —    | 1600 | 50  | Vacuum |
| 50 |       | 5   | 0.5  | —    | 0.5  | 0.5  | 1800 | 230 | Vacuum |
| 51 |       | 5   | 1    | —    | —    | —    | 1800 | 230 | Vacuum |
| 52 |       | 5   | —    | 1    | —    | —    | 1800 | 230 | Vacuum |
| 53 | $MnB_2$ | 5 | —  | —    | —    | 1    | 1800 | 230 | Vacuum |
| 54 |       | 5   | —    | —    | 1    | —    | 1800 | 230 | Vacuum |
| 55 |       | 5   | 0.5  | —    | 0.5  | 0.5  | 1800 | 230 | Vacuum |

TABLE 1-2-continued

| Exp. No. | Second diboride, % | Binder boride, % | | | | Sintering conditions | | |
|---|---|---|---|---|---|---|---|---|
| | | NiB | Ni₄B₃ | FeB | CoB | Temp., °C | Pressure kg/cm² | Atmosphere |
| 56 | | 5 | 0.5 | — | 0.5 | 0.5 | 1800 | —* | Vacuum |

TABLE 1-3

| Exp. No. | Second diboride % | Binder boride, % | | | | Sintering conditions | | |
|---|---|---|---|---|---|---|---|---|
| | | NiB | Ni₄B₃ | FeB | CoB | Temp., °C | Pressure kg/cm² | Atmosphere |
| 57 | | 5 | 1 | — | — | — | 1800 | 230 | Vacuum |
| 58 | | 5 | — | 1 | — | — | 1800 | 230 | Vacuum |
| 59 | HfB₂ | 5 | — | — | — | 1 | 1800 | 230 | Vacuum |
| 60 | | 5 | — | — | 1 | — | 1800 | 230 | Vacuum |
| 61 | | 5 | 0.5 | — | 0.5 | 0.5 | 1800 | 230 | Vacuum |
| 62 | | 5 | 1 | — | — | — | 1300 | 300 | Vacuum |
| 63 | | 5 | — | 1 | — | — | 1500 | 230 | Vacuum |
| 64 | | 5 | — | — | — | 1 | 1500 | 230 | Vacuum |
| 65 | | 5 | — | — | 1 | — | 1600 | 230 | Vacuum |
| 66 | AlB₂ | 5 | 1 | — | — | — | 1300 | 300 | Hydrogen |
| 67 | | 5 | — | 1 | — | — | 1500 | 230 | Hydrogen |
| 68 | | 5 | — | — | — | 1 | 1500 | 230 | Hydrogen |
| 69 | | 5 | — | — | 1 | — | 1600 | 230 | Hydrogen |
| 70 | | 5 | 0.5 | — | 0.5 | 0.5 | 1600 | 230 | Hydrogen |
| 71 | | 5 | 1 | — | — | — | 1800 | 230 | Vacuum |
| 72 | | 5 | — | 1 | — | — | 1800 | 230 | Vacuum |
| 73 | | 5 | — | — | — | 1 | 1800 | 230 | Vacuum |
| 74 | | 5 | — | — | 1 | — | 1800 | 230 | Vacuum |
| 75 | ZrB₂ | 5 | 0.5 | — | — | — | 1800 | 230 | Vacuum |
| 76 | | 5 | — | 0.5 | — | — | 1800 | 230 | Hydrogen |
| 77 | | 5 | — | — | — | 0.5 | 1800 | 230 | Hydrogen |
| 78 | | 5 | — | — | 0.5 | — | 1800 | 230 | Hydrogen |
| 79 | | 5 | 0.5 | — | 0.5 | 0.5 | 1800 | 230 | Hydrogen |
| 80 | YB₂ | 5 | — | — | — | 0.5 | 1800 | 230 | Vacuum |

TABLE 2-1, 2-2, 2-3

| Exp. No. | Bending strength, kg/mm² | Vickers hardness, kg/mm², at room temp. | Vickers hardness, kg/mm², at 1000° C. | Relative density, % |
|---|---|---|---|---|
| 1 | 180 | 3300 | 2200 | 100 |
| 2 | 150 | 3300 | 2300 | 100 |
| 3 | 150 | 3200 | 2200 | 99.9 |
| 4 | 140 | 2900 | 2100 | 100 |
| 5 | 170 | 3300 | 2400 | 100 |
| 6 | 180 | 3300 | 2200 | 100 |
| 7 | 140 | 3000 | 2100 | 99.9 |
| 8 | 160 | 3000 | 2200 | 100 |
| 9 | 180 | 2000 | 1000 | 100 |
| 10 | 170 | 3200 | 2300 | 100 |
| 11 | 170 | 3000 | 2200 | 100 |
| 12 | 150 | 2900 | 2000 | 99.9 |
| 13 | 160 | 3000 | 2100 | 99.9 |
| 14 | 180 | 3200 | 2300 | 100 |
| 15 | 160 | 3300 | 2400 | 100 |
| 16 | 170 | 3000 | 2200 | 100 |
| 17 | 150 | 3300 | 2300 | 100 |
| 18 | 160 | 2000 | 1100 | 100 |
| 19 | 170 | 3200 | 2400 | 100 |
| 20 | 150 | 3300 | 2300 | 100 |
| 21 | 140 | 3200 | 2300 | 100 |
| 22 | 160 | 3300 | 2400 | 100 |
| 23 | 150 | 3300 | 2400 | 100 |
| 24 | 170 | 3200 | 2300 | 100 |
| 25 | 160 | 3200 | 2300 | 99.9 |
| 26 | 140 | 3000 | 2000 | 100 |
| 27 | 150 | 3300 | 2400 | 100 |
| 28 | 150 | 3300 | 2300 | 99.9 |
| 29 | 140 | 2000 | 1100 | 100 |
| 30 | 150 | 3200 | 2300 | 100 |
| 31 | 140 | 3100 | 2200 | 100 |
| 32 | 180 | 3300 | 2300 | 100 |
| 33 | 170 | 3200 | 2300 | 100 |
| 34 | 160 | 3200 | 2100 | 99.9 |
| 35 | 170 | 3300 | 2300 | 100 |
| 36 | 160 | 3100 | 2200 | 100 |
| 37 | 150 | 3100 | 2200 | 100 |
| 38 | 160 | 3300 | 2400 | 100 |
| 39 | 150 | 2100 | 1200 | 100 |
| 40 | 180 | 3300 | 2400 | 100 |
| 41 | 160 | 3200 | 2200 | 100 |
| 42 | 150 | 3100 | 2100 | 100 |
| 43 | 180 | 3300 | 2400 | 100 |
| 44 | 170 | 3200 | 2200 | 100 |
| 45 | 160 | 3100 | 2100 | 100 |
| 46 | 160 | 3200 | 2200 | 100 |
| 47 | 160 | 3100 | 2100 | 100 |
| 48 | 150 | 3000 | 2300 | 99.9 |
| 49 | 180 | 2200 | 1100 | 100 |
| 50 | 180 | 3300 | 2200 | 100 |
| 51 | 180 | 3300 | 2400 | 100 |
| 52 | 160 | 3100 | 2200 | 100 |
| 53 | 180 | 3300 | 2300 | 100 |
| 54 | 170 | 3200 | 2300 | 100 |
| 55 | 180 | 3300 | 2200 | 100 |
| 56 | 160 | 3000 | 2000 | 100 |
| 57 | 160 | 3200 | 2200 | 100 |
| 58 | 150 | 3100 | 2100 | 100 |
| 59 | 180 | 3300 | 2300 | 100 |
| 60 | 170 | 3300 | 2400 | 100 |

TABLE 2-3-continued

| Exp. No. | Bending strength, kg/mm$^2$ | Vickers hardness, kg/mm$^2$, at room temp. | Vickers hardness, kg/mm$^2$, at 1000° C. | Relative density, % |
|---|---|---|---|---|
| 61 | 180 | 3300 | 2300 | 100 |
| 62 | 120 | 3000 | 2100 | 100 |
| 63 | 110 | 2900 | 2000 | 100 |
| 64 | 130 | 3200 | 2100 | 100 |
| 65 | 120 | 3200 | 2200 | 100 |
| 66 | 150 | 3100 | 2200 | 100 |
| 67 | 140 | 3100 | 2100 | 100 |
| 68 | 160 | 3200 | 2200 | 100 |
| 69 | 150 | 3300 | 2300 | 100 |
| 70 | 170 | 3200 | 2100 | 100 |
| 71 | 110 | 3000 | 2000 | 100 |
| 72 | 100 | 2900 | 1800 | 100 |
| 73 | 120 | 3100 | 2200 | 100 |
| 74 | 120 | 3200 | 2200 | 100 |
| 75 | 150 | 3200 | 2200 | 100 |
| 76 | 130 | 3100 | 2000 | 100 |
| 77 | 160 | 3300 | 2300 | 100 |
| 78 | 160 | 3300 | 2300 | 100 |
| 79 | 170 | 3200 | 2000 | 100 |
| 80 | 120 | 3000 | 2200 | 100 |

TABLE 3

| Exp. No. | Binder boride, % NiB | Binder boride, % CoB | Binder boride, % FeB | Sintering pressure, kg/cm$^2$ | Bending stength at room temp., kg/mm$^2$ | Relative density, % |
|---|---|---|---|---|---|---|
| 81 | 1 | — | — | 200 | 45 | 99.3 |
| 82 | — | 1 | — | 200 | 42 | 99.8 |
| 83 | — | — | 1 | 200 | 42 | 99.8 |
| 84 | 10 | — | — | 165 | 110 | — |
| 85 | — | 10 | — | 165 | 80 | — |
| 86 | — | — | 10 | 165 | 140 | — |

EXAMPLE 3. (EXPERIMENTS NO. 105 TO NO. 117)

The experimental procedures were substantially the same as in Example 1 except that the number of the metal diborides was increased to at least three including TiB$_2$ and TaB$_2$ in all of the experiments. Thus, the amounts of the metal diborides combined with TiB$_2$ including TaB$_2$ were each from 5 to 15% and the amounts of the binder borides, i.e. NiB, Ni$_4$B$_3$, FeB and CoB, were each 1%, the balance being TiB$_2$. Sintering of each of the powder mixtures was carried out by the techniques of hot pressing in a graphite mold for 30 minutes at 1800° C. under a pressure of 230 kg/cm$^2$ in vacuum.

The formulation and the results of the measurements of the mechanical strengths of the sintered bodies are summarized in Table 5. The relative density of the sintered bodies was 100% in each of the experiments.

EXAMPLE 4. (EXPERIMENTS NO. 118 TO NO. 123)

Powder mixtures were prepared each by intimately blending titanium diboride with one or all of the metal diborides TaB$_2$, VB$_2$, NbB$_2$, MoB$_2$ and CrB$_2$, one or all of the binder borides NiB, FeB and CoB and an alloy composed of 92% of nickel and 8% of phosphorus. The amounts of the metal diborides other than titanium diboride, the binder borides and the nickel-phosphorus alloy were each from 1 to 5%, from 0.5 to 1.0% and from 0.01 to 0.5%, respectively, the balance being titanium diboride.

TABLE 4

| Exp. No. | Base diboride | TiB$_2$ % | Binder boride (%) | Sintering temp., °C. | Bending strength, kg/mm$^2$ | Vickers hardness, kg/mm$^2$, at room temp. | Vickers hardness, kg/mm$^2$, at 1000° C. |
|---|---|---|---|---|---|---|---|
| 87 |  | 1 | CoB (1) | 1800 | 160 | 2700 | 1800 |
| 88 |  | 20 | CoB (1) | 1800 | 170 | 2800 | 2000 |
| 89 | TaB$_2$ | 40 | CoB (1) | 1800 | 170 | 3000 | 2100 |
| 90 |  | 10 | FeB (1) | 1800 | 170 | 2700 | 1900 |
| 91 |  | 10 | NiB (1) | 1800 | 160 | 2700 | 1900 |
| 92 |  | 10 | Ni$_4$B$_3$ (1) | 1800 | 140 | 2600 | 1700 |
| 93 |  | 1 | NiB (0.5) | 1800 | 130 | 2300 | 1200 |
| 94 |  | 10 | NiB (0.5) | 1800 | 140 | 2500 | 1300 |
| 95 | NbB$_2$ | 40 | NiB (0.5) | 1800 | 160 | 3000 | 1900 |
| 96 |  | 5 | Ni$_4$B$_3$ (1) | 1800 | 120 | 2200 | 1200 |
| 97 |  | 5 | CoB (1) | 1800 | 140 | 2300 | 1300 |
| 98 |  | 5 | FeB (1) | 1800 | 140 | 2300 | 1500 |
| 99 |  | 1 | CoB (1) | 1600 | 100 | 2000 | 1300 |
| 100 |  | 10 | CoB (1) | 1600 | 110 | 2100 | 1400 |
| 101 | VB$_2$ | 40 | CoB (1) | 1600 | 120 | 2300 | 1600 |
| 102 |  | 5 | NiB (1) | 1600 | 100 | 2000 | 1200 |
| 103 |  | 5 | Ni$_4$B$_3$ (1) | 1600 | 90 | 2000 | 1100 |
| 104 |  | 5 | FeB (1) | 1800 | 120 | 2100 | 1300 |

TABLE 5

| Exp. No. | Ta | Nb | V | Cr | Mo | Mn | Hf | Al | Zr | Y | NiB | Ni$_4$B$_3$ | FeB | CoB | Bending strength kg/mm$^2$ | Vickers hardness, kg/mm$^2$, at room temp. | Vickers hardness, kg/mm$^2$, at 1000° C. |
|---|---|---|---|---|---|---|---|---|---|---|---|---|---|---|---|---|---|
| 105 | 5 | 5 | — | — | — | — | — | — | — | — | — | — | — | 1 | 180 | 3100 | 2300 |
| 106 | 5 | — | 5 | — | — | — | — | — | — | — | — | — | — | 1 | 170 | 3200 | 2400 |
| 107 | 5 | — | — | 2 | — | — | — | — | — | — | — | — | — | 1 | 160 | 3200 | 2300 |
| 108 | 5 | — | — | — | 5 | — | — | — | — | — | 1 | — | — | — | 170 | 3200 | 2300 |
| 109 | 5 | — | — | — | — | 5 | — | — | — | — | — | — | 1 | — | 180 | 3200 | 2200 |
| 110 | 5 | — | — | — | — | — | 5 | — | — | — | — | — | — | 1 | 170 | 3300 | 2400 |
| 111 | 5 | 5 | 5 | — | — | — | — | — | — | — | 1 | — | 1 | 1 | 180 | 3300 | 2400 |
| 112 | 10 | 10 | 10 | — | — | — | — | — | — | — | 1 | — | — | — | 180 | 3300 | 2400 |
| 113 | 15 | 15 | 15 | — | — | — | — | — | — | — | — | 1 | — | — | 170 | 3200 | 2400 |
| 114 | 5 | 5 | 5 | — | — | — | — | — | — | — | — | — | — | 1 | 180 | 3300 | 2400 |

TABLE 5-continued

| Exp. No. | Combined metal diboride, % | | | | | | | | | | Binder boride, % | | | | Bending strength kg/mm² | Vickers hardness, kg/mm², at | |
|---|---|---|---|---|---|---|---|---|---|---|---|---|---|---|---|---|---|
| | Ta | Nb | V | Cr | Mo | Mn | Hf | Al | Zr | Y | NiB | Ni₄B₃ | FeB | CoB | | room temp. | 1000° C. |
| 115 | 5 | 5 | 5 | — | — | — | — | — | — | — | — | — | 1 | — | 180 | 3300 | 2400 |
| 116 | 5 | 5 | 5 | 5 | 5 | — | — | — | — | — | — | — | — | 1 | 170 | 3000 | 2200 |
| 117 | 5 | 5 | 5 | 5 | 5 | 5 | 5 | 5 | 5 | 5 | 1 | — | 1 | 1 | 170 | 3000 | 2200 |

The powder mixtures were subjected to sintering by the techniques of hot pressing for 30 minutes in a graphite mold at a temperature of 1600° or 1700° C. under a pressure of 230 kg/cm² in vacuum.

The formulation, sintering temperature and the results of the measurements of the mechanical strengths are summarized in Table 6. In one of the experiments, the nickel-phosphorus alloy was replaced with a powder mixture of 80% by weight of nickel and 20% by weight of phosphorus. The relative density of the sintered bodies was 100% in each of the experiments.

TABLE 6

| Exp. No. | Combined diboride, % | | | | | Binder boride, % | | | Ni-P alloy, % | Sintering temp., °C. | Bending strength, kg/mm² | Vickers hardness, kg/mm², at | |
|---|---|---|---|---|---|---|---|---|---|---|---|---|---|
| | Ta | V | Nb | Mo | Cr | NiB | FeB | CoB | | | | room temp. | 1000° C. |
| 118 | 5 | — | — | — | — | — | — | 1 | 0.5 | 1600 | 190 | 3200 | 2000 |
| 119 | — | 3 | — | — | — | 1 | — | — | 0.01 | 1600 | 150 | 3200 | 2000 |
| 120 | — | — | 5 | — | — | — | 1 | — | 0.005 | 1700 | 160 | 3200 | 2000 |
| 121 | — | — | — | 3 | — | — | — | 1 | 0.1** | 1600 | 180 | 3000 | 2000 |
| 122 | — | — | — | — | 2 | — | — | 1 | 0.2 | 1600 | 160 | 3000 | 1900 |
| 123 | 1 | 1 | 1 | 1 | 1 | 0.5 | 0.5 | 0.5 | 0.1 | 1600 | 170 | 3000 | 2100 |

**A mixture of 80% by weight of nickel and 20% by weight of phosphorus

What is claimed is:

1. A refractory sintered body comprising
   (a) from 70 to 99.99% by weight of a combination of at least two metal diborides
      (1) one of said metal diborides being $TiB_2$, and
      (2) at least one of said other metal diborides being selected from the group consisting of $CrB_2$, $TaB_2$, $MnB_2$, $MoB_2$, $YB_2$, $VB_2$, $HfB_2$, $NbB_2$, $AlB_2$ and $ZrB_2$
      the minimum amount of a metal diboride in said combination being 0.5% by weight, and
   (b) from 0.01 to 30% by weight of at least one compound selected from the group consisting of NiB, $Ni_4B_3$, FeB and CoB,
   said weight percentages being based on the weight of the sintered body.

2. A sintered body according to claim 1 wherein the weight of $TiB_2$ is at least 20%.

3. A body according to claims 1 or 2 having a bending strength of 150 to 200 kg/mm².

4. A body according to claims 1 or 2 having a Vickers hardness at 1000° C. of at least 2000 kg/mm².

5. A body according to claim 1 or 2 which in addition contains 0.001 to 15% by weight of an alloy composed of 80–97% by weight of nickel and 3–20% by weight of phosphorous.

* * * * *